United States Patent [19]

Baker

[11] Patent Number: 4,773,736

[45] Date of Patent: * Sep. 27, 1988

[54] METHOD OF FABRICATING A LIQUID CRYSTAL OPTICAL CROSS POINT SWITCHING MATRIX DEVICE

[75] Inventor: Anthony P. Baker, New York, N.Y.

[73] Assignee: Alcatel USA, Corp., New York, N.Y.

[*] Notice: The portion of the term of this patent subsequent to Jun. 7, 2005 has been disclaimed.

[21] Appl. No.: 795,138

[22] Filed: Nov. 5, 1985

[51] Int. Cl.⁴ ................................................. G02F 1/33
[52] U.S. Cl. ................................. 350/334; 350/96.14; 350/96.15; 350/347 V
[58] Field of Search ................... 350/347 V, 334, 343, 350/96.14, 96.15, 96.16

[56] References Cited

U.S. PATENT DOCUMENTS

| | | | |
|---|---|---|---|
| 3,807,127 | 4/1974 | Stern | 350/343 |
| 3,918,794 | 11/1975 | Milton | 350/96.16 |
| 4,278,327 | 7/1981 | McMahon et al. | 350/347 V |
| 4,390,245 | 6/1983 | Shimizu et al. | 350/343 |
| 4,493,528 | 1/1985 | Shaw et al. | 350/96.15 |
| 4,521,069 | 6/1985 | Ikeda | 350/96.15 |
| 4,556,288 | 12/1985 | Sekimura | 350/347 V |

OTHER PUBLICATIONS

Soref, R., "Fiber-Optic Switching with Liquid Crystals," Proceedings of the Society of Photo-Optical Instrumentation Engineers, SPIE, vol. 176, Guided Wave Optical Systems and Devices II (1979), pp. 124–132.

Primary Examiner—John K. Corbin
Assistant Examiner—Martin Lerner
Attorney, Agent, or Firm—Peter C. Van DerSluys

[57] ABSTRACT

A method for fabricating a liquid crystal optical cross point switching matrix includes the steps of forming a plurality of pedestals, each pedestal defining one half of a liquid crystal optical switching device that operates independent of critical angle alignment of the optical beams associated therewith.

9 Claims, 3 Drawing Sheets

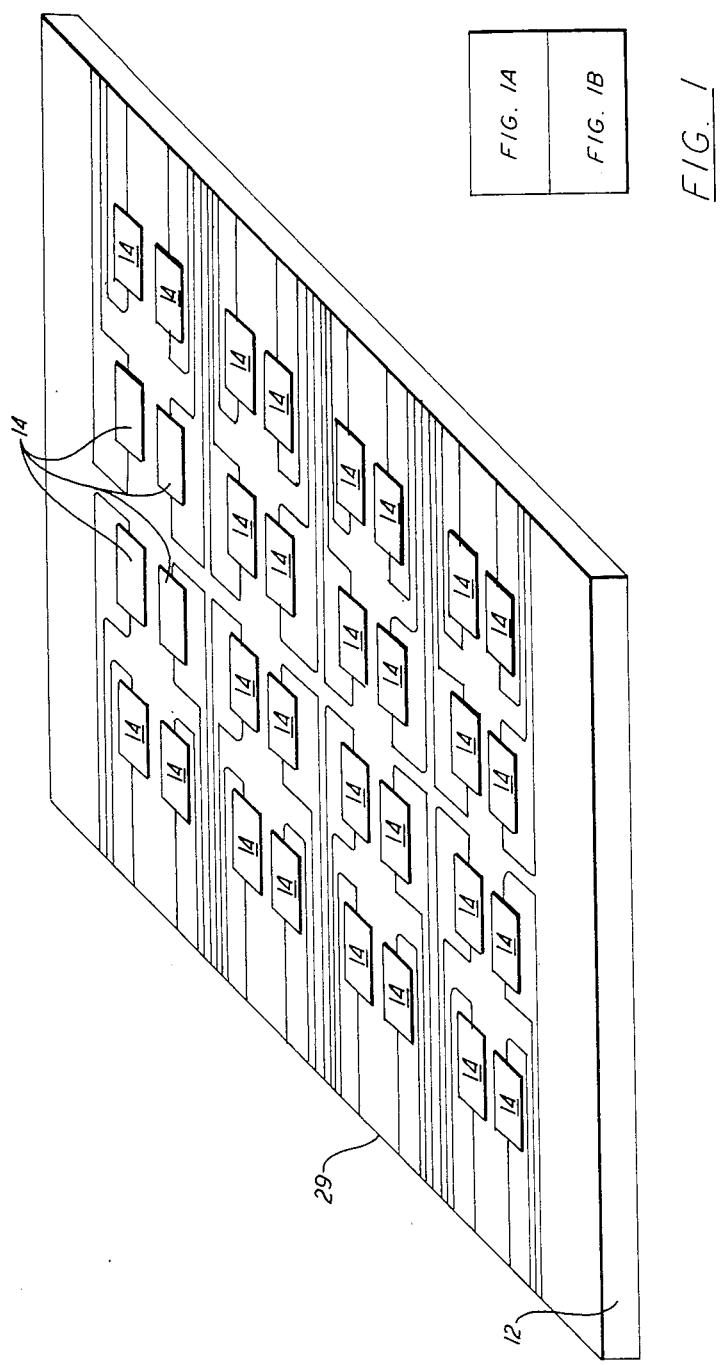

METHOD OF FABRICATING A LIQUID CRYSTAL OPTICAL CROSS POINT SWITCHING MATRIX DEVICE

CROSS REFERENCE TO RELATED APPLICATIONS

This application is related to one, or more, of the following U.S. patent application Ser. Nos. 795,156; 795,151;795,150;795,149; 795,155;795,148;795,157; 795,154;795,152;795,296, all filed on even date herewith.

BACKGROUND OF THE INVENTION

The present invention generally relates to a method for fabricating a liquid crystal optical cross point switching matrix device and, in particular, relates to such a method including steps for forming an array of pedestals on a pair of glass slides.

A liquid crystal optical cross point switching matrix device is discussed and described in U.S. patent application Ser. No. 795,148 entitled LIQUID CRYSTAL OpTICAL CROSS POINT SWITCHING DEVICE filed on even date herewith and assigned to the assignee hereof. This application is deemed incorporated herein by reference. The matrix discussed and described therein preferably includes the use of a liquid crystal optical crystal switching device that avoids the requirement of critical angle alignment of the various light ports thereof. One such liquid crystal optical switching device is discussed and described in U.S. patent application Ser. No. 795,155, entitled LIQUID CRYSTAL OPTICAL SWITCHING DEVICE WITH INTEGRALLY ATTACHED OpTICAL FIBERS, also filed on even date herewith. This application is also deemed incorporated herein by reference.

As described in the above referenced applications such liquid crystal optical switching devices avoid critical angle alignments. Further, a liquid crystal optical switching matrix can readily be formed therefrom by the appropriate interconnection of the optical fibers thereof. As such, a liquid crystal optical cross point switching matrix can be provided without necessitating expensive prisms or other expensive elements, such as lenses, or the like.

Consequently, since large numbers of these devices and matrices are required in, for example, an optical signal based communication network, a method amenable to the large volume production of such matrices is needed to fully realize the potential benefits of such a network.

SUMMARY OF THE INVENTION

Accordingly, one object of the present invention is to provide a method for fabricating such liquid crystal optical cross point switching matrices.

This object is accomplished, at least in part, by a method including steps for defining a plurality of devices of such a matrix on opposing transparent support members and introducing liquid crystal material therebetween.

Other objects and advantages of the present invention will become apparent to those skilled in the art from the following detailed description read in conjunction with the appended claims and the drawings attached hereto.

BRIEF DESCRIPTION OF THE DRAWINGS

FIGS. 1 and 1B are a perspective view of a pair of transparent support members having a liquid crystal optical cross point switching matrix device defined thereon.

DETAILED DESCRIPTION OF THE INVENTION

The present method of fabricating a liquid crystal optical cross point switching matrix generally includes the steps of forming, on both a first and a second transparent support members, 10 and 12, respectively, an array of liquid crystal optical cross point switching device pedestals 14, assembling the support members, 10 and 12, such that the pedestals 14 of each of the arrays are aligned, introducing a liquid crystal material 16 between the opposing aligned pedestals 14, and affixing optical fibers 18 to the support members, 10 and 12, at each pedestal location.

Figure 1B:
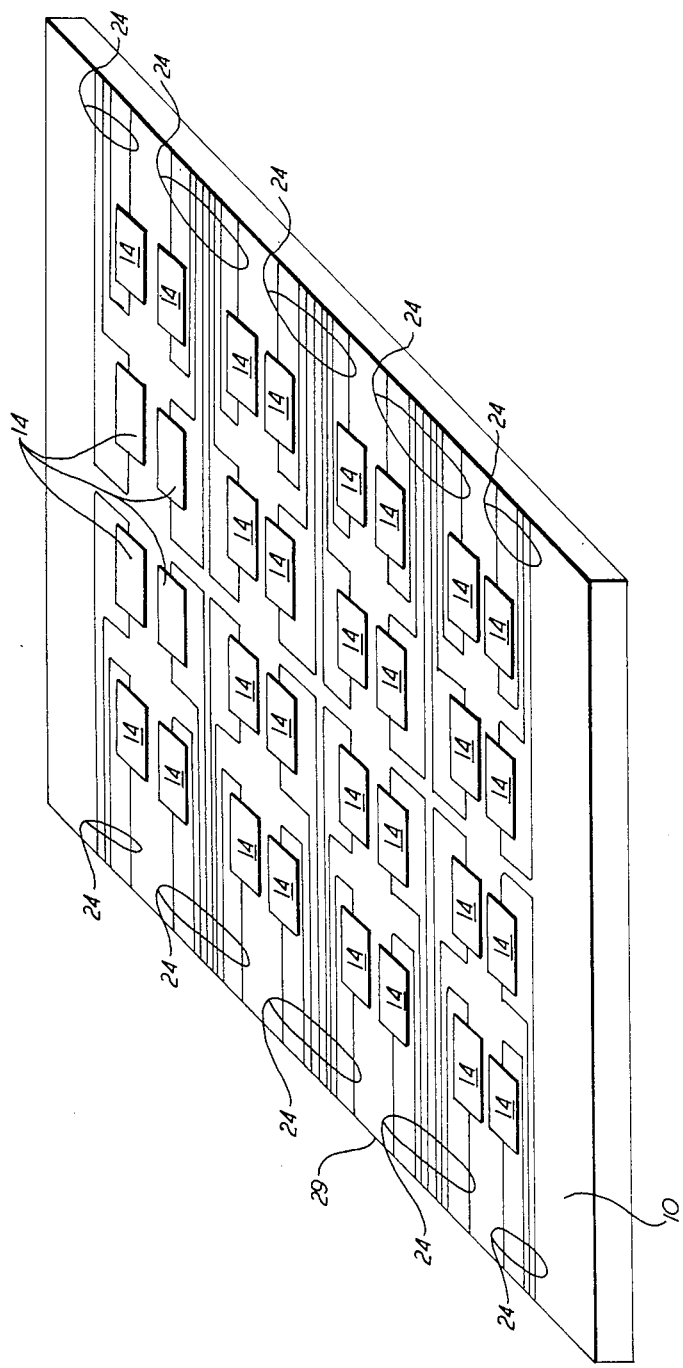

As shown in FIGS. 1 and 1B, each of the first and second transparent support members, 10 and 12, respectively, such as, for example, glass slides, has one array of pedestals 14 formed thereon. In the preferred method each glass slide is optically flat on the inner and outer surfaces, 22 and 38, respectively, thereof and has a thickness on the order of 1 millimeter and a refractive index about equal to that of the core of the associated optical fiber. Preferably, as more clearly shown in FIG. 2, each pedestal 14 includes a first layer 20 of index of refraction matching material adjacent the inner surface 22 of the slide, 10 or 12, a transparent electrode 24 overlying the first layer 20, a second layer 26 of index of refraction matching material overlying the electrode 24 and a surfactant layer 28 overlying the second layer 26. Each layer 20, 24, 26 and 28, is preferably formed using known deposition, masking and etching techniques. The layers, 20 and 26, of index of refraction matching material can either be single layers having appropriate index of refraction gradients thereacross or multiple layers of materials each having a slightly different index of refraction. One particular set of materials for the multiple layer embodiment of the index of refraction matching layers, 20 and 26, is discussed and described in U.S. patent application Ser. No. 795,150, entitled LIQUID CRYSTAL CELL FOR USE IN AN OPTICAL SWITCH, filed on even date herewith. This application is deemed incorporated herein by reference.

The transparent electrodes 24, as shown in FIGS. 1 and 1B, are configured so that each extends to an edge 29 of the members, 10 and 12, whereat they are readily available for connection to a control voltage means. Thus, when assembled, each position of the array includes a pair of spaced apart electrodes 24 having index matching layers, 20 and 26, on both sides thereof.

Figure 2:
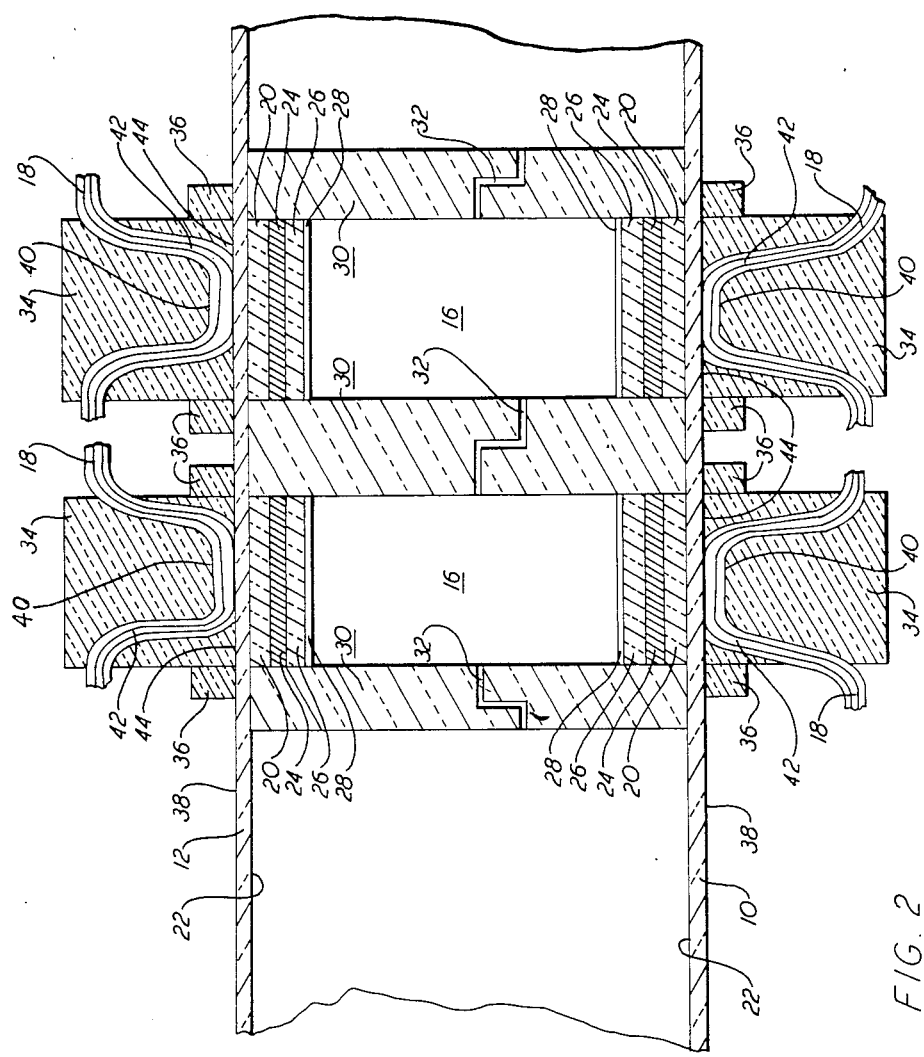
FIG. 2 is a partial cross sectional view of one element of a matrix formed by the present method.

The glass slides are assembled and retained in position by a plurality of spacers 30, more clearly shown in FIG. 2. For extended lifetime of the matrix the spacers 30 should be inert to the liquid crystal material 16. In one embodiment, each spacer 30 includes a plurality of passage means 32 therein whereby the liquid crystal material 16 can be introduced by, for example, capillary action between aligned pedestals 14 subsequent to the assembly of the two glass slides.

The assembly of the members, 10 and 12, includes initially positioning the spacers 30 on the inner surface 22 of one of the members, 10 or 12, by, for example, means of an epoxy that is inert to the liquid crystal material. Thereafter, the inner surface 32 of the other member, 12 or 10, is placed on the spacers 30 and fixed in place by an inert epoxy. The size of the spacer 30 should be selected to ensure a gap of about less than 10 micrometers between the pairs of aligned pedastals 14.

Subsequent to the assembly of the members, 10 and 12, the liquid crystal material 16 is introduced, in one embodiment, by means of the passages 32 into the gaps between the pairs of aligned pedestals 14. Preferably, the assembled members, 10 and 12, are placed in a vacuum during the introduction of the liquid crystal material 16 to ensure that the innermost gaps thereof are completely filled with liquid crystal material 16.

As an alternative to the use of a substantial vacuum to draw the liquid crystal material 16 into the innermost array positions, each array position can be provided with an access opening through one of the transparent support members, 10 or 12. In this embodiment, the liquid crystal material 16 can be directly injected to fill each gap with the liquid crystal material 16. Thereafter each access opening can be sealed with an epoxy.

The optical fibers 18 are preferably preformed in the support members 34 that are affixed between mounting guides 36 affixed onto the outer surface 38 of each member, 10 and 12. The mounting guide 36 can be affixed either before or after the assembly of the transparent support members, 10 and 12.

Subsequent to the attaching of the mounting guides 36, the plurality of optical fiber support members 34, each having an optical fiber 18 therein, are positioned over the pedestals 14. The support members 34 can either be individual blocks each having one optical fiber constrained therein or, alternatively, can extend the width of the members, 10 and 12, and include a plurality of optical fibers 18 extending therefrom. Preferably, the guides 36 are epoxied in place along the spacing between the pedestals 14 such that the support members 34 are aligned with the pedestals 14 when inserted into the openings left by the guides 36. Regardless of the size and shape of the support members 34, each optical fiber 18 contained therein has a segment 40 of the core 42 thereof exposed at the surface 44 of the support member 34 adjacent the outer surface 38 of the transparent member 10 and 12.

As a consequence of the above assembly, a plurality, for example, sixteen, pairs of liquid crystal optical switches, each operating independent of critical angle alignment, is formed. Thereafter, the free ends of the optical fibers 18 are then connected as shown and discussed in the above referenced patent application entitled A LIQUID CRYSTAL OPTICAL CROSS POINT SWITCHING DEVICE to form, for example, a four by four liquid crystal optical cross point switching matrix.

Larger, or smaller, matrices can be formed by use of the present method and, in fact, the method can be extended to considerably larger matrices that are subsequently severed along appropriate lines in the transparent members, 10 and 12, to produce relatively smaller matrices.

Although the present invention has been described with respect to one particular embodiment it will be understood that other methods or techniques can be used that nevertheless do not depart from the spirit or scope of the present invention. Hence, the present invention is deemed limited only by the appended claims and the reasonable interpretation thereof.

What is claimed is:

1. A method of fabricating a liquid crystal optical cross point switching matrix; said method comprising the steps of:
    providing first and second transparent support members, each of said support members having an inner and outer surface;
    forming, on said inner surface of each one of first and second transparent support members, an array of liquid crystal optical cross point switching device pedestals;
    assembling said first and second support members with their inner surfaces in facing relationship such that said arrays of pedestals are aligned and proximate each other;
    introducing a liquid crystal material between said aligned pedestals; and
    providing, on the outer surfaces of said transparent support members, optical fibers proximate each of said pedestals whereby said optical fibers can be interconnected as a cross point switching matrix.

2. Method as claimed in claim 1 wherein said pedestal forming step includes:
    forming, at each array location, a transparent electrode, each transparent electrode extending to an edge of said transparent support member.

3. Method as claimed in claim 2 further comprising the steps of:
    providing, between each said inner surface and each said electrode, a first layer of index matching material; and
    providing, between each said electrode and said liquid crystal material, a second layer of index of refraction matching material.

4. Method as claimed in Claim 1 further comprising the step of:
    affixing, prior to said assembly step, a plurality of spacers to one of said inner surfaces.

5. Method as claimed in claim 4 further comprising the step of:
    providing, on each outer surface of said support members, a plurality of optical fiber guide blocks.

6. Method as claimed in Claim 5 further comprising the steps of:
    preforming optical fiber support members; and
    positioning said preformed optical fiber support members over said pedestals via said guide blocks; and
    affixing said optical fiber support members to said outer surfaces of said transparen support members.

7. Method as claimed in Claim 6 wherein said preforming step includes:
    rigidly locating an exposed core of each of said optical fibers coplanar with one surface of said optical fiber support member.

8. Method as claimed in Claim 1 wherein said liquid crystal material introduction step includes:
    providing passage means between each pair of aligned pedestals; and
    supplying, under vacuum, said liquid crystal material to said matrix whereby said liquid crystal material, via said vacuum, is introduced between each pair of aligned pedestals.

9. Method as claimed in claim 1 wherein said liquid crystal material introduction step includes:
    providing an access opening to the pair of aligned pedestals via one of said outer surfaces; and
    injecting said liquid crystal material into each said access opening.

* * * * *